United States Patent Office 3,090,776
Patented May 21, 1963

3,090,776
POLYMERIZATION OF OLEFINS USING AN ALUMINUM HALIDE AND AN ORGANOMETALLIC COMPOUND AS CATALYST
Gaetano F. D'Alelio, South Bend, Ind., assignor, by direct and mesne assignments, to Dal Mon Research Co., Cleveland, Ohio, a corporation of Delaware
No Drawing. Filed Mar. 31, 1958, Ser. No. 724,879
6 Claims. (Cl. 260—93.7)

This invention is concerned generally with the polymerization of olefins such as ethylene, propylene, butene-1, styrene, butadiene, isoprene, vinyl cyclohexene and the like olefins with a catalyst derived from (a) an aluminum halide, for example, aluminum chloride and (b) at least one organometal compound of a metal selected from the class of Ti, Zr, V, Nb, Ta, Cr, Mo, W, and Ce corresponding to the general formula $M(R)_n$ where M represents the metal, R represents a hydrocarbon group and $n$ is greater than 2 and corresponds to the valency of the metal in the compound.

The aluminum halides, for example, aluminum chloride, are known as Friedel-Crafts catalysts and they are not effective in converting ethylene to high molecular weight solid polymers. The Friedel-Crafts catalysts are less effective in converting such olefins as propylene, butene-1, hexene-1, vinyl cyclohexene, vinyl cyclohexane, etc. to high molecular weight solid polymers or butadiene, isoprene, pentadiene 1,3, etc. to high molecular weight, useful rubbery polymers. It is likewise known that organometal compounds of the formula $M(R)_n$ of the type described hereinabove are not considered to be effective polyolefin catalysts, since no polyethylene is obtained when $(C_5H_5)_2Ti(C_6H_5)_2$ is used as a catalyst in attempts to polymerize ethylene [Journal Polymer Science, XXVI, No. 112, p. 120 (1957)]. Compounds of the class $M(R)_n$ are disclosed generally in British Patent 778,639 as being suitable polymerization catalysts when used with an alkali-metal-tetrahydrocarbon compound, a lithium hydrocarbon compound, a tin tetraalkyl compound or a cadmium alkyl to reduce the element present to a valency of two. The activity of these catalysts (British Patent 778,639) is not greatly different from those of the structure $M(R)_n$ since little or no reduction of the metal (M) occurs. However, my invention differs from the British invention in that I do not start with the metal in a valency of two, nor do I use a reducing agent but rather I use an aluminum halide which is not a reducing agent. It is surprising, therefore, that a mixture of an aluminum halide and the organometals of this invention should be active polyolefin catalysts. It is further surprising that these catalysts are capable of polymerizing an olefin, such as ethylene, to high density, high molecular weight polyethylene and of producing linear polymers from monoolefins and polyolefins, and of producing copolymers from mixtures of olefins.

The nature of the catalysts of this invention, obtained by reacting the aluminum halide with the organometal is not known at present and they appear to be complex reaction products. The aluminum halide used may be aluminum chloride, aluminum bromide, aluminum fluoride or aluminum iodide or mixture of these halides, but for economic reasons, aluminum chloride is preferred.

The organometal compounds, $M(R)_n$, used in the practice of this invention are prepared by the usual methods regularly used to prepare such compounds. The general method consists in replacing the halogens in a halogen compound of the metal by an organic radical in a stepwise reaction until the halogen atoms are substituted. The general reaction is illustrated with titanium tetrachloride in its reaction with Grignard reagents or other organometals such as alkyl sodium, alkyl potassium, alkyl lithium or an aryl sodium or lithium, etc. [Chemistry and Industry, 307 (1954); J.A.C.S. 75, 1011 (1953); J.A.C.S., 73, 3877 (1951); J.A.C.S., 75, 3882 (1953); J.A.C.S., 76, 2278 (1954); J.A.C.S., 76, 4281 (1954)]. It is possible, by stepwise substitution, to produce the organometal compounds used in this invention, which have more than one type of hydrocarbon attached to the metal atom, for example,

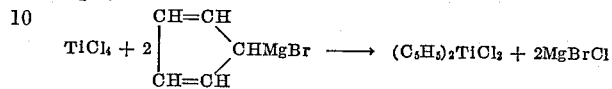

or

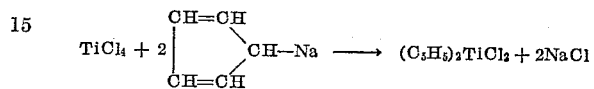

then

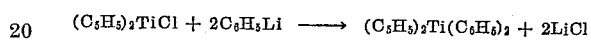

By using a trialkyl metal halide, for example, $(C_4H_9)_3TiCl$ [B.P. 154–155° C./2 mm., J. App. Chem., p. 250 (1952)], tetrasubstituted organometal compounds, such as $(C_4H_9)_3TiC_6H_5$, $(C_4H_9)_3Ti(C_5H_5)$, $$(C_4H_9)_3TiC_2H_5$$

are readily prepared by substitution reactions. Likewise, by using a dialkyl titanium dihalide, e.g., $(C_4H_9)_2TiCl_2$ [J. Chem. Soc., p. 2773 (1952)], dialkyl titanium compounds with two other different hydrocarbon groups may be prepared, e.g.

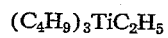

Also, by using a monoalkyl titanium trihalide, an alkyl titanium with three other hydrocarbon groups may be prepared, e.g. $(C_4H_9)(C_3H_7)Ti(C_2H_5)(CH_3)$, etc. Also, the hydrocarbon groups attached to the metal atom may be the same, as for example, $(C_4H_9)_4Ti$ (B.P. 189°/16 mm.). Some other intermediates suitable for the preparation of the organometals used in the practice of this invention, in which the R groups may be the same or different are $R_3ZrX$, $R_2ZrX_2$, $RZrX_3$, $R_3VX$, $R_2VX_2$, $RVX_3$, $R_2NbX_2$, $R_2TaX_2$, $R_3TaX$, $R_3MoX$, $R_2MoX_2$, $R_2MoX_3$, $R_3WX$, $R_2WX_2$, $R_2WX_3$, etc. in which R is a hydrocarbon and X is a halogen [J.A.C.S., 75, 4281 (1954)].

The R group in the organometal compound may be an aliphatic hydrocarbon radical such as methyl, ethyl, propyl, butyl, amyl, octyl, dodecyl, allyl, pentenyl-1, pentenyl-2, pentenyl-3, undecanyl-1, dodecenyl-2, etc. or a cycloaliphatic group such as cyclohexanyl, cyclopentanyl, cyclobutanyl, cyclobutenyl, cyclohexenyl, alkylcyclohexanyl, alkylcyclohexenyl, arylcyclohexenyl, cyclopentadienyl, alkylcyclopentadienyl, etc., or an aralkyl radical such as benzyl, 2-phenylethyl, 1-phenylethyl, phenylpropyl, naphthylethyl, phenylethenyl, etc., or the aromatic and alkyl aromatic radicals such as phenyl, tolyl, xylyl, carbazole, naphthyl, methylnaphthyl, diphenyl, terphenyl, etc. Radical groups represented by R which contain less than about twelve carbon atoms in each R group are preferred because of availability and economy. The alkylmetal compounds, $M(R)_n$, have low stability to air, oxygen and water, whereas the cyclopentadienyl compounds and the aryl compounds show greater stability but all of them should be processed or handled in an inert atmosphere such as in nitrogen or in an inert gas, or in an inert solvent protected with an inert atmosphere, or transferred from one step or operation to another without exposing them to contamination. In many cases, these organometals may be used without isolation from the solvent or medium in which they have been prepared.

The catalysts used in the practice of this invention may be prepared simply by mixing the organometal or a mixture of organometals with an aluminum halide, or mixture of halides, but preferably they are mixed in the presence of an inert solvent or medium such as the hydrocarbons, for example, hexane, heptane, benzene, toluene, cyclohexane, or mixtures of hydrocarbons, and, in some cases, ethers, such as diethyl ether, tetrahydrofurane and the like may be used alone or in conjunction with a hydrocarbon or a halogenated hydrocarbon, as for example, chlorobenzene. After mixing of the organometal and the aluminum halide, the catalyst may be used as such or the mixture may be heated to the boiling point of the solvent at subatmospheric, atmospheric or superatmospheric pressure, or, if the organometal and the aluminum halide are added to a suitable reactor, they may be added at room temperature or below room temperature and heat applied to the reactor before or during the addition of the olefin.

The ratio of the organometal to the aluminum halide that may be used in the preparation of the catalysts of this invention is not critical and may be from 1 part organometal to 100 or more parts of aluminum halide to 100 parts organometal to 1 or less part aluminum halide. Satisfactory results are obtained in a range of from 1 part organometal to 10 parts aluminum halide to 10 parts organometal to 1 part aluminum halide. It has been found also that the nature of the catalyst resulting from the ratio of the organometal to the aluminum halide, for example, aluminum chloride, determines to some extent the nature of the polymer. If large amounts of aluminum halide, for example, aluminum chloride are used, or if the reaction between the organometal and the aluminum halide is incomplete so that there remains an excess of the aluminum halide, lower molecular weight polymers are obtained than if lesser amounts of aluminum halide is present. The ratio of the organometal to the aluminum halide may be used to control the molecular weight of the polymer or copolymer desired.

As a polymerization medium substantially any inert material may be used which is liquid under the conditions or the temperature employed in the polymerization. Hydrocarbon solvents are preferred and are preferably free substantially of materials that react with the catalysts such as $O_2$, $H_2O$, alcohols, ketones and the like. Suitable solvents include pentane, hexane, cyclohexane, octane, benzene, toluene, xylene, chlorobenzene and the like. In some cases, the polymerization may be carried out in the absence of a liquid medium. In other cases, the monomer or mixtures of monomers themselves, if liquid, may be used as the polymerization medium, such as styrene, isoprene, 2,3-dimethyl butadiene, vinyl cyclohexane, vinyl cyclohexene and the like. The amount of catalyst may be varied over a wide range. Relatively small amounts are operable to form relatively large amounts of polymer. In general, a practical range is 0.001 to 0.1 part of catalyst per part of olefin polymerized. Even larger amounts of catalyst are operable but large amounts are uneconomical and make the polymer more difficult to purify. When low molecular weight polymers are obtained by the process of this invention, they are useful as chemical intermediates in alkylation, epoxidation, chlorination, sulfonation, etc., and as plasticizers for the solid polymers produced by the procedures described herein. The catalysts as prepared in the practice of this invention are useful in polymerizing olefins at temperatures ranging from below or about room temperature to temperatures of 200° C. or even higher and at pressures ranging from atmospheric or a few atmospheres to pressures as high as 10,000 p.s.i. or higher. For practical operations, temperatures in the range of 20–200° C. and pressures of 100–2000 p.s.i. are suitable. The following examples illustrate without limiting the invention.

*Example I*

Three and three-tenths (3.3) grams of
$$(C_6H_5)_2Ti(C_5H_5)_2$$
and 1.3 grams of aluminum chloride are added to 100 ml. of toluene in a stainless steel reactor equipped with stirrer, inlet port, heating means, etc. The transfer of the catalyst components to the reactor is made in an inert atmosphere to avoid contamination with moisture and oxygen. The reactor is then heated to 125–150° C. and pressured with ethylene to 500–700 p.s.i. Ethylene is rapidly absorbed and the reactor is repressured from time to time to replace the ethylene consumed. After 6 hours, even though the system is still absorbing ethylene, the run is terminated, the autoclave cooled, vented, opened, and the crude, solid polyethylene transferred to a container containing about 200 ml. of methanol acidified with HCl and refluxed for 1 hour. The purified solid white polyethylene is then separated by filtration and dried. The yield is about 120 grams.

Similar results are obtained when other organometal compounds such as
$$(C_4H_9)_4Ti, \quad (C_4H_9)_3TiC_2H_5, \quad Zr(C_4H_9)_4, \quad (C_4H_9)_3ZrC_2H_5$$
or compounds of the formula $M(R)_n$, as described hereinabove are used instead of $(C_6H_5)_2Ti(C_5H_5)_2$. Likewise aluminum fluoride, aluminum bromide, aluminum iodide may be used in place of aluminum chloride, as well as the reaction product of an aluminum halide with aluminum or magnesium as disclosed in my copending applications Serial Nos. 718,442 and 721,653, filed March 3, 1958, and March 17, 1958, respectively. Substitution of the ethylene by other olefins, such as $$CH_2=CHCH_3, \quad CH_2=CH-CH_2CH_3,$$
$$CH_2=CHC_6H_{11}, \quad CH_2=CHC_6H_5,$$
$$CH_2=C-CH=CH_2$$
$$\quad \mid$$
$$\quad CH_3$$
$$CH_2=C(CH_3)_2, \quad CH_2=CHC_6H_4CH=CH_2,$$
$$\quad CH_3$$
$$\quad \mid$$
$$CH_2=CHC_6H_4C=CH_2$$

etc. produces the corresponding polymer.

*Example II*

Two and eight-tenths (2.8) grams of $(C_4H_9)_4Ti$ and 1.3 grams of $AlCl_3$ in 200 ml. heptane are refluxed for 2 hours in an inert atmosphere in a 1-liter reactor equipped with stirrer, heating and cooling means. Propylene is added to the reaction flask continuously over a period of five hours and 92 grams of solid polypropylene is isolated. When butene-1, styrene, vinyl cyclohexane and vinyl cyclohexene are substituted for the propylene, the corresponding polymer is obtained. A very active polymerization catalyst may also be prepared by using
$$(C_4H_9)Ti(C_2H_5)_3, \text{ or } (C_4H_9)_2Ti(C_2H_5)_2, (C_4H_9)_3TiC_2H_5$$
or the corresponding zirconium derivatives instead of $(C_4H_9)_4Ti$ of this example.

*Example III*

The procedure of Example I is repeated to produce copolymers from mixtures of olefins containing at least two monomers such as 10 to 90 parts of ethylene to 90 to 10 parts propylene; 5 to 95 parts styrene to 95 to 5 parts vinyl cyclohexane; 2 to 98 parts propylene to 98 to 2 parts isoprene, etc.; tripolymers such as those of (1) styrene, vinyl cyclohexane and cyclohexene; (2) propylene, butadiene and isoprene, (3) divinyl benzene, styrene and hexene-1, etc., in which the monomer concentrations may be varied over wide ratios may also be prepared by the use of the catalyst of this example.

Example IV

To the catalyst of Example II, 50 grams of liquid isoprene is added slowly over a period of 2 hours and the mixture is heated to 50° C. for 3 hours, after which it is cooled and the product added to 1 liter of methanol to precipitate the polymer. Two grams of phenyl-β-naphthyl amine is added to the polymer which is then washed with water and dried. Thirty parts of this polymer are compounded with 1 part of zinc oxide, 1 part of stearic acid, 0.2 part of mercaptobenzothiazole and 0.75 part of sulfur and vulcanized at 270° F. for 25 minutes to produce a vulcanized product with properties similar to those of vulcanized natural rubber. Butadiene, phenylbutadiene, 2,3-dimethylbutadiene, etc., may be used alone or in combinations with other dienes, trienes and monoolefins to produce vulcanizable compositions containing reactive residual double bonds in the polymer.

Example V

Twenty-five parts of a commercial divinyl benzene containing approximately 50 percent of divinyl benzene and 50 percent of ethyl styrene are added slowly at 50° C. and with stirring to 100 parts of toluene containing the catalyst of Example II. The reaction is performed in a suitable reactor, equipped with a stirrer, and maintained in an inert atmosphere. Upon completion of the addition of the divinyl benzene mixture, the reaction is continued for five hours, after which it is cooled and added to a liter of methanol acidified with HCl. The polymer is isolated by filtration, dried in a vacuum dessicator and stored under nitrogen. About 20 parts of polymer are obtained which contains unsaturation corresponding to a copolymer of the structure

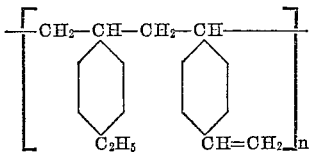

On heating the polymer converts, especially in the presence of air to an insoluble, infusible polymer. In the presence of a catalyst, as for example, the per-catalysts such as benzoyl peroxide, a catalytic conversion to the insoluble, infusible state is obtained rapidly.

Example VI

Substitution of $(C_5H_5)_2V(C_4H_9)_2$ and $AlCl_3$ for the catalysts of Examples I, II, III, IV and V resulted in active polymerization catalysts.

Example VII $(C_5H_5)_2TaC_2H_5$ and $(C_5H_5)_2NbC_2H_5$ are substituted for the $(C_5H_5)_2V(C_4H_9)_2$ of Example VI to produce an active polymerization catalyst.

The catalysts of this invention are useful in polymerizing olefins having a $CH_2\!=\!C\!<$ group, and include such monomers as hexatriene; hexadiene-1,5; pentadiene-1,3; allene, diallyl; dimethallyl; 2,4,4-trimethyl pentene-1; methyl pentadiene-1,3 etc., as well as mixtures containing cyclopentadiene, myrcene, alpha methyl styrene, etc.

I claim:

1. The process of polymerization, capable of producing solid polymers thereby, comprising the step of polymerizing a normal-olefin selected from the class consisting of ethylene, propylene and butene-1 with a catalyst comprising the reaction product of (1) an aluminum halide and (2) at least one organometal of the formula $M(R)_n$ wherein M is a metal selected from the class consisting of Ti, Zr, V, Nb, Ta, Cr, Mo, W and Ce, R is a hydrocarbon radical and $n$ is a numerical value greater than two and corresponds to the valency of M, the ratio of said catalyst components being 0.01 to 100 parts by weight of aluminum halide per part by weight of said organometal.

2. The process of polymerization, capable of producing solid polymers thereby, comprising the step of polymerizing ethylene at a temperature above 20° C. with a catalyst comprising the reaction product of (1) aluminum chloride and (2) at least one organometal of the formula $M(R)_n$ wherein M is a metal selected from the class consisting of Ti, Zr, V, Nb, Ta, Cr, Mo, W and Ce, R is a hydrocarbon radical and $n$ is a numerical value greater than two and corresponds to the valency of M, the ratio of said catalyst components being 0.01 to 100 parts by weight of aluminum chloride per part by weight of said organometal.

3. The process of claim 1 in which the olefinic hydrocarbon is ethylene and the metal is Ti.

4. The process of claim 1 in which the olefinic hydrocarbon is propylene and the metal is Ti.

5. The process of claim 1 in which the olefinic hydrocarbon is butene-1 and the metal is Ti.

6. The process of polymerization, capable of producing solid polymers thereby, comprising the step of polymerizing an olefinic hydrocarbon that comprises heating the olefin in an inert solvent in intimate contact with a catalyst comprising the reaction product of aluminum chloride and an organometal of the formula $MoR_4$ where R is a hydrocarbon radical, the ratio of said catalyst component being 0.01 to 100 parts by weight of aluminum chloride per part by weight of said organometal.

References Cited in the file of this patent

UNITED STATES PATENTS 2,440,498    Young et al. _____ Apr. 27, 1948